(12) United States Patent
Womack et al.

(10) Patent No.: US 8,744,228 B2
(45) Date of Patent: Jun. 3, 2014

(54) TELECOMMUNICATIONS PATCHING SYSTEM WITH CABLE MANAGEMENT SYSTEM AND RELATED CABLE MANAGEMENT EQUIPMENT

(75) Inventors: Wade Womack, Allen, TX (US); Joseph C. Livingston, Frisco, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 1240 days.

(21) Appl. No.: 12/471,075

(22) Filed: May 22, 2009

(65) Prior Publication Data
US 2010/0296789 A1   Nov. 25, 2010

(51) Int. Cl.
*G02B 6/00* (2006.01)

(52) U.S. Cl.
USPC .......................................... 385/135; 385/137

(58) Field of Classification Search
None
See application file for complete search history.

(56) References Cited

U.S. PATENT DOCUMENTS

| | | | |
|---|---|---|---|
| 2,143,768 A | 1/1939 | Eichwald |
| 2,427,349 A | 9/1947 | Boynton |
| 3,199,068 A | 8/1965 | Neenan |
| 3,611,264 A | 10/1971 | Ellis, Jr. |
| 4,536,052 A | 8/1985 | Baker et al. |
| 4,538,868 A | 9/1985 | Cruise et al. |
| 4,747,020 A | 5/1988 | Brickley et al. |
| 4,815,104 A | 3/1989 | Williams et al. |
| 4,824,196 A | 4/1989 | Bylander |
| 4,832,436 A | 5/1989 | Goto et al. |
| 4,995,688 A | 2/1991 | Anton et al. |
| 5,011,257 A | 4/1991 | Wettengel et al. |
| 5,127,082 A | 6/1992 | Below et al. |
| 5,129,842 A | 7/1992 | Morgan et al. |
| 5,178,554 A | 1/1993 | Siemon et al. |
| 5,204,929 A | 4/1993 | Machall et al. |
| 5,238,426 A | 8/1993 | Arnett |
| 5,299,956 A | 4/1994 | Brownell et al. |
| 5,302,140 A | 4/1994 | Arnett |
| 5,303,519 A | 4/1994 | Mustee et al. |
| 5,310,363 A | 5/1994 | Brownell et al. |
| 5,363,465 A | 11/1994 | Korkowski et al. |
| 5,370,541 A | 12/1994 | Bossard |
| 5,370,553 A | 12/1994 | Zimmerman |
| RE34,955 E | 5/1995 | Anton et al. |
| 5,412,751 A | 5/1995 | Siemon et al. |
| 5,530,954 A | 6/1996 | Larson et al. |
| 5,575,665 A | 11/1996 | Shramawick et al. |
| 5,575,668 A | 11/1996 | Timmerman |
| 5,591,045 A | 1/1997 | Pepe et al. |

(Continued)

FOREIGN PATENT DOCUMENTS

EP   0 736 937     10/1996
EP   1 478 056 A1  11/2004

*Primary Examiner* — Sarah Hahm
(74) *Attorney, Agent, or Firm* — Myers Bigel Sibley & Sajovec, P.A.

(57) ABSTRACT

A communications interconnection system includes: a communications rack having a pair of upright members; a patch panel mounted to the upright members, the patch panel having mounting locations for telecommunications connectors; and a cable management system mounted to the rack. The cable management system comprises a cable mounting member having a cable securing portion and a pair of arms attached to the cable securing portion, the arms being substantially parallel to each other and slidably mounted relative to the panel to enable adjustment of the distance between the cable securing portion and the communications rack. This configuration can enable the cable management system to be used with communications racks of different sizes and designs.

16 Claims, 11 Drawing Sheets

(56) References Cited

U.S. PATENT DOCUMENTS

| | | |
|---|---|---|
| 5,639,261 A | 6/1997 | Rutkowski et al. |
| 5,645,449 A | 7/1997 | Sabo |
| 5,659,650 A | 8/1997 | Arnett |
| 5,674,093 A | 10/1997 | Vaden |
| 5,676,566 A | 10/1997 | Carlson |
| 5,700,167 A | 12/1997 | Pharney et al. |
| 5,734,776 A | 3/1998 | Puetz |
| 5,735,714 A | 4/1998 | Orlando et al. |
| 5,773,763 A | 6/1998 | Stachulla |
| 5,788,087 A | 8/1998 | Orlando |
| 5,836,786 A | 11/1998 | Pepe |
| 5,892,870 A | 4/1999 | Fingler et al. |
| 5,897,395 A | 4/1999 | Arnett |
| 5,903,698 A | 5/1999 | Poremba et al. |
| 5,921,402 A | 7/1999 | Magenheimer |
| 5,944,535 A | 8/1999 | Bullivant et al. |
| 5,945,633 A | 8/1999 | Ott et al. |
| 5,947,765 A | 9/1999 | Carlson, Jr. et al. |
| 5,956,449 A | 9/1999 | Otani et al. |
| 5,961,345 A | 10/1999 | Finn et al. |
| 5,967,836 A | 10/1999 | Bailey |
| 5,969,294 A | 10/1999 | Eberle et al. |
| 5,975,962 A | 11/1999 | Laukonis |
| 5,984,720 A | 11/1999 | Milner et al. |
| 6,146,192 A | 11/2000 | Cabalka et al. |
| 6,208,796 B1 | 3/2001 | Williams Vigliaturo |
| 6,231,380 B1 | 5/2001 | Cabalka et al. |
| 6,236,795 B1 | 5/2001 | Rodgers |
| 6,242,698 B1 | 6/2001 | Baker, III et al. |
| 6,273,752 B1 | 8/2001 | Martin et al. |
| 6,468,112 B1 | 10/2002 | Follingstad et al. |
| 6,497,578 B1 | 12/2002 | Kwong et al. |
| 6,537,106 B1 | 3/2003 | Follingstad |
| 6,565,260 B2 | 5/2003 | Belaidi et al. |
| 6,600,106 B2 | 7/2003 | Standish et al. |
| 6,614,978 B1 | 9/2003 | Caveney |
| 6,626,697 B1 | 9/2003 | Martin et al. |
| 6,711,339 B2 | 3/2004 | Puetz et al. |
| 6,772,887 B2 | 8/2004 | Audibert et al. |
| 6,866,541 B2 | 3/2005 | Barker et al. |
| 6,916,199 B2 | 7/2005 | Follingstad |
| 6,918,786 B2 | 7/2005 | Barker et al. |
| 6,974,348 B2 | 12/2005 | Bentley |
| 7,343,078 B2 | 3/2008 | Spisany et al. |
| 7,529,458 B2 | 5/2009 | Spisany et al. |
| 2003/0022552 A1 | 1/2003 | Barker et al. |
| 2003/0096536 A1 | 5/2003 | Clark et al. |
| 2003/0129871 A1 | 7/2003 | Follingstad |
| 2004/0192094 A1 | 9/2004 | Navarro et al. |
| 2005/0191901 A1 | 9/2005 | Follingstad |
| 2005/0197005 A1 | 9/2005 | Bentley |
| 2007/0031102 A1* | 2/2007 | McNutt et al. ............ 385/135 |
| 2008/0002937 A1 | 1/2008 | Spisany et al. |
| 2008/0181571 A1 | 7/2008 | Spisany et al. |

* cited by examiner

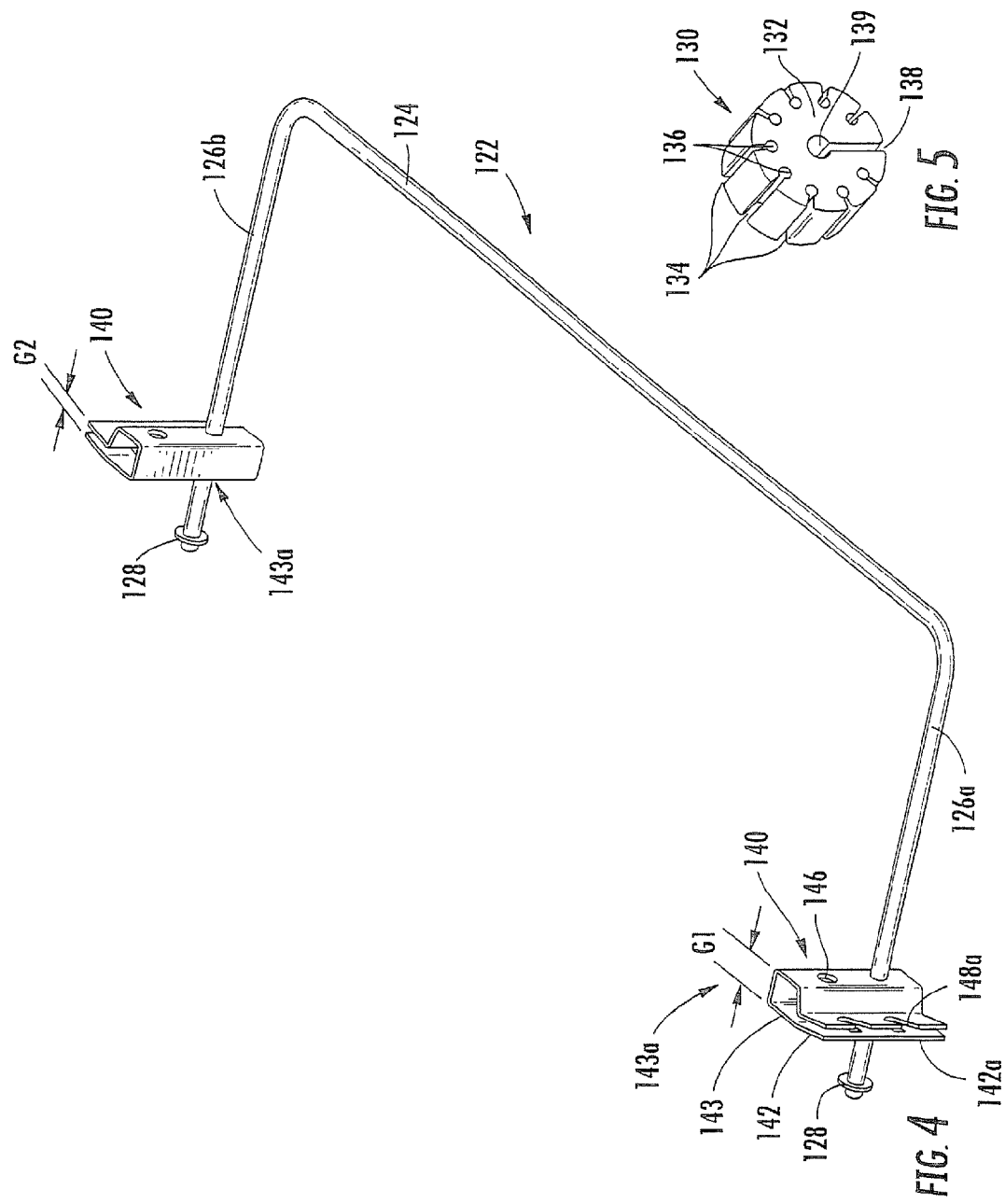

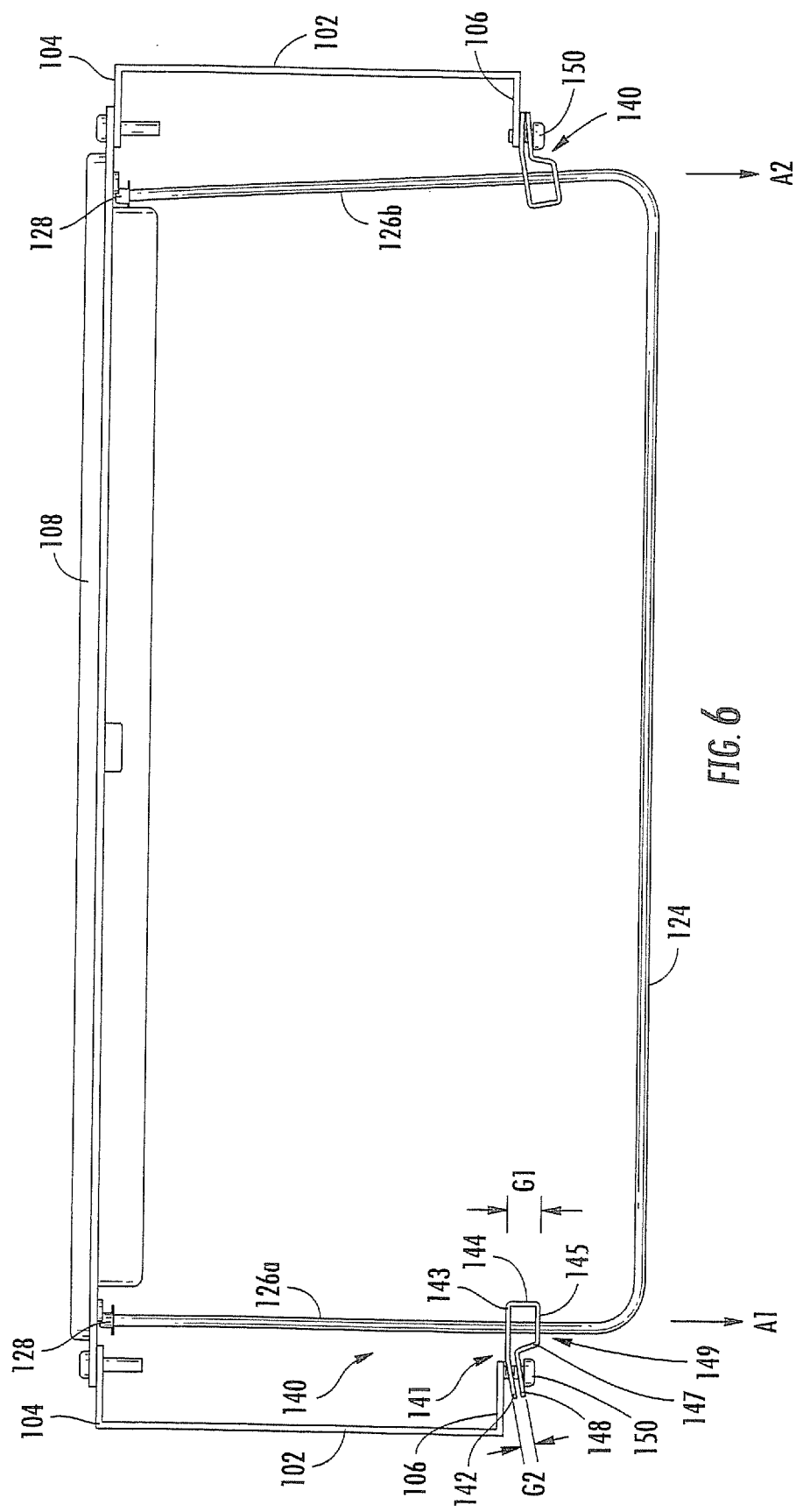

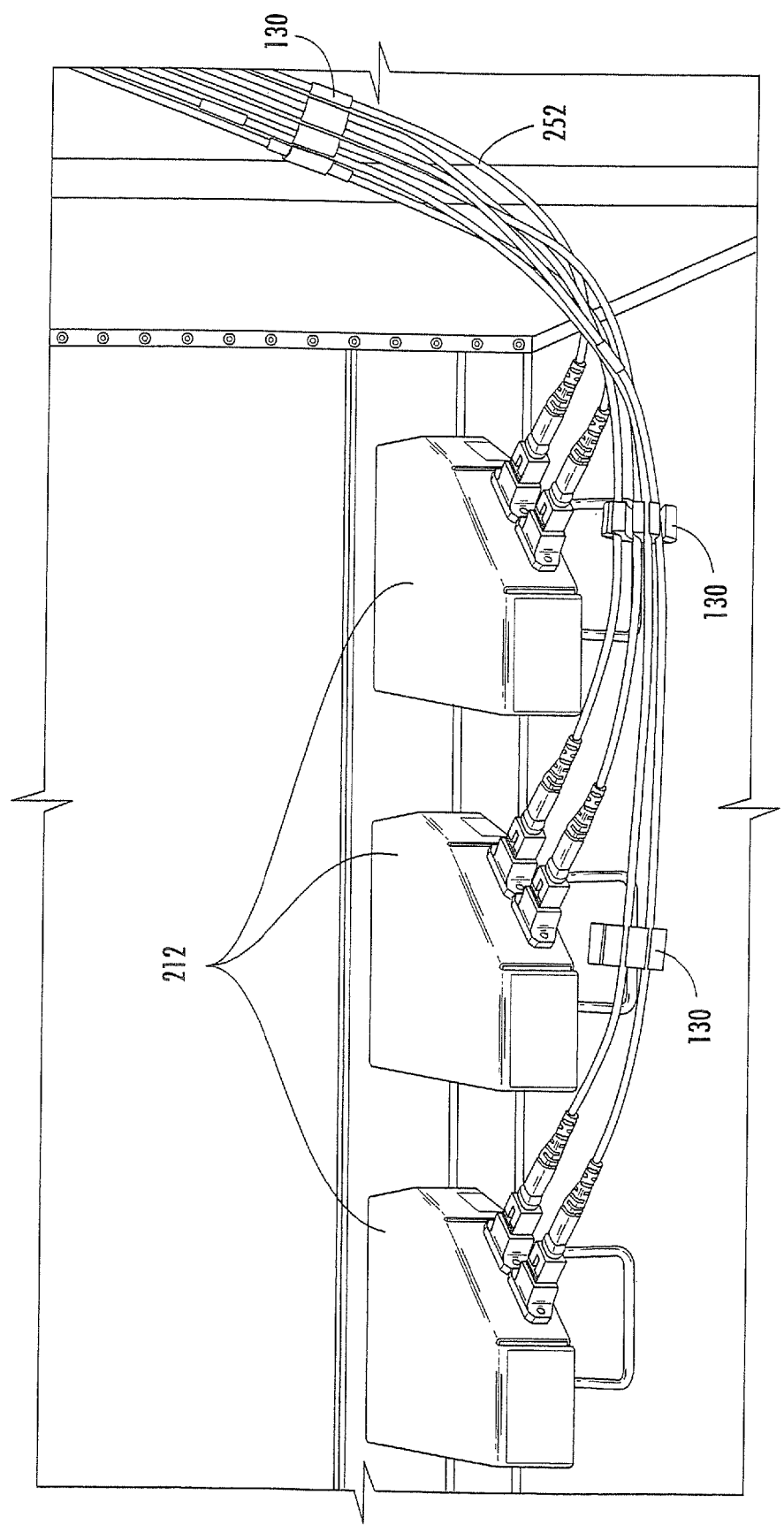

TELECOMMUNICATIONS PATCHING SYSTEM WITH CABLE MANAGEMENT SYSTEM AND RELATED CABLE MANAGEMENT EQUIPMENT

FIELD OF THE INVENTION

The present invention relates generally to telecommunications equipment, and more particularly to cord and cable distribution apparatus.

BACKGROUND OF THE INVENTION

In the telecommunications industry, the use of fiber optic cables for carrying transmission signals is rapidly growing. To interconnect fiber optic equipment, fiber distribution frames and racks have been developed. Such frames and racks are typically located in a communications closet, data room, or the like, where technicians can easily connect and reconnect, or "patch," equipment in an organized and efficient manner. Examples of fiber distribution frames and racks are shown in U.S. Pat. Nos. 5,497,444 and 5,758,003, which are hereby incorporated by reference.

Often racks/frames are populated with panels that provide mounting locations for optical fibers and cables. An exemplary panel is illustrated in FIGS. 1 and 2. The panel 20 is mounted to the front flanges 23 of a rack 22 via mounting holes 21 that are preformed in the rack 22. The illustrated panel 20 includes mounting locations for four modules 24 that receive and interconnect optical cables and fibers. Optical fiber patch cords 26 connect to the front of the modules 24, and optical fiber cables 28 connect to the rear of the modules 24 via multi-fiber push-on (MPO) connectors 25. Typically, the panel 20 includes a trough 30 into which the patch cords 26 are routed.

Racks are customarily manufactured with either a 3 inch or 6 inch depth (wherein the depth is measured between the front flanges 23 and rear flanges 27 of the rack 22), or in some cases a rack may have no rear flange at all (often such racks are on the form of a cabinet). Because the panel 20 is mounted to the front flanges 23 of the rack 22, the placement of the trough 30 for patch cord routing is relatively simple and predictable. However, management of the cables 28 routed from the rear of the modules 24 can be more difficult.

SUMMARY

As a first aspect, embodiments of the present invention are directed to a communications interconnection system. The system comprises: a communications rack having a pair of upright members; a patch panel mounted to the upright members, the patch panel having mounting locations for telecommunications connectors; and a cable management system mounted to the rack. The cable management system comprises a cable mounting member having a cable securing portion and a pair of arms attached to the cable securing portion, the arms being substantially parallel to each other and slidably mounted relative to the panel to enable adjustment of the distance between the cable securing portion and the communications rack. This configuration can enable the cable management system to be used with communications racks of different sizes and designs.

As a second aspect, embodiments of the present invention are directed to a clip suitable for securing a telecommunications cable to a mounting structure. The clip comprises: a body with an external surrounding surface; a plurality of cable slots extending radially inwardly from the external surrounding surface, the cable slots being of a first width and configured to receive a communications cord therein; and a mounting slot extending radially inwardly from the external surrounding surface, the mounting slot being of a second width and configured to receive a mounting structure therein. This configuration can facilitate the securing and organization of cables to a mounting structure.

As a third aspect, embodiments of the present invention are directed to a mounting bracket for a cable organizing system of a telecommunications interconnection system. The mounting bracket comprises: a first leaf panel having a compression panel with a first hole and a tilting panel with a second hole, the compression panel being disposed at an oblique angle to the tilting panel; a merging panel attached to the tilting panel; and a second leaf attached to the merging panel and having a rod receiving panel and a deflecting panel. The rod receiving panel is disposed in generally parallel relationship with the tilting panel, the rod receiving panel being spaced apart from the tilting panel to form a gap of a first width; the rod receiving panel having a third hole that is generally aligned with the second hole of the tilting panel. The deflecting panel is disposed in generally parallel relationship with the compressing panel, the deflecting panel being spaced apart from the compression panel to form a gap of a second width, the deflecting panel having an aperture that is generally aligned with the first hole of the compression panel.

BRIEF DESCRIPTION OF THE FIGURES

FIG. 4 is a rear perspective view of the mounting rod and mounting brackets of the cable management system of FIG. 3.

FIG. 5 is a perspective view of an exemplary clip of the cable management system of FIG. 3.

FIG. 6 is a top view of the cable management system of FIG. 3, with the left mounting bracket in a loosened condition, such that the arm of the mounting rod inserted therein can slide relative to the mounting bracket, and the right mounting bracket in a tightened condition, such that the arm of the mounting bracket inserted therein is fixed and cannot slide relative to the mounting bracket.

FIG. 10 is a rear perspective view of a communications patching system in which multiple clips of FIG. 5 are used to organize optical fiber cords without a mounting member.

DETAILED DESCRIPTION

Figure 1:
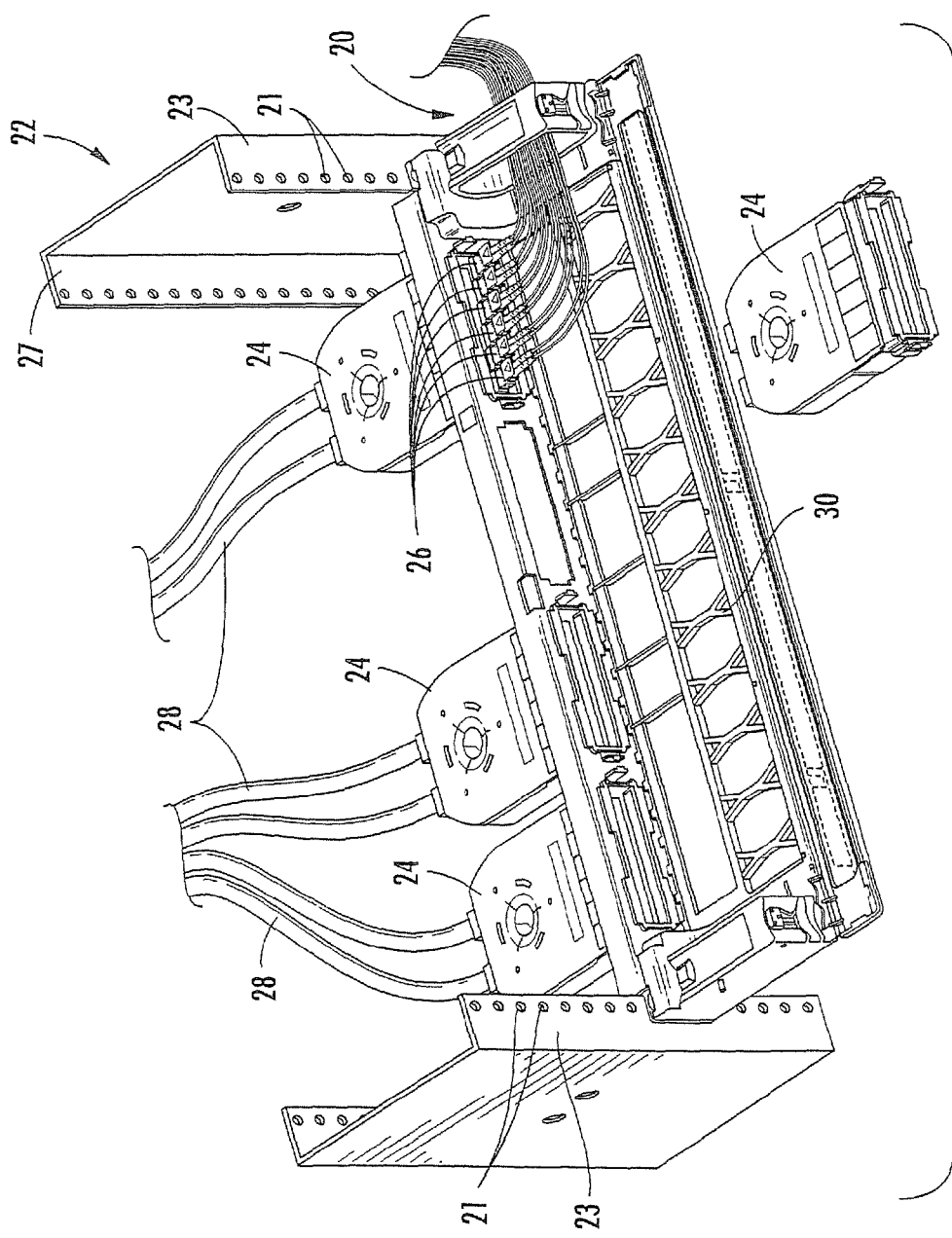
FIG. 1 is a front perspective view of a prior communications patching system including a patch panel for interconnecting optical fibers and cables mounted to a communications rack.
Figure 2:
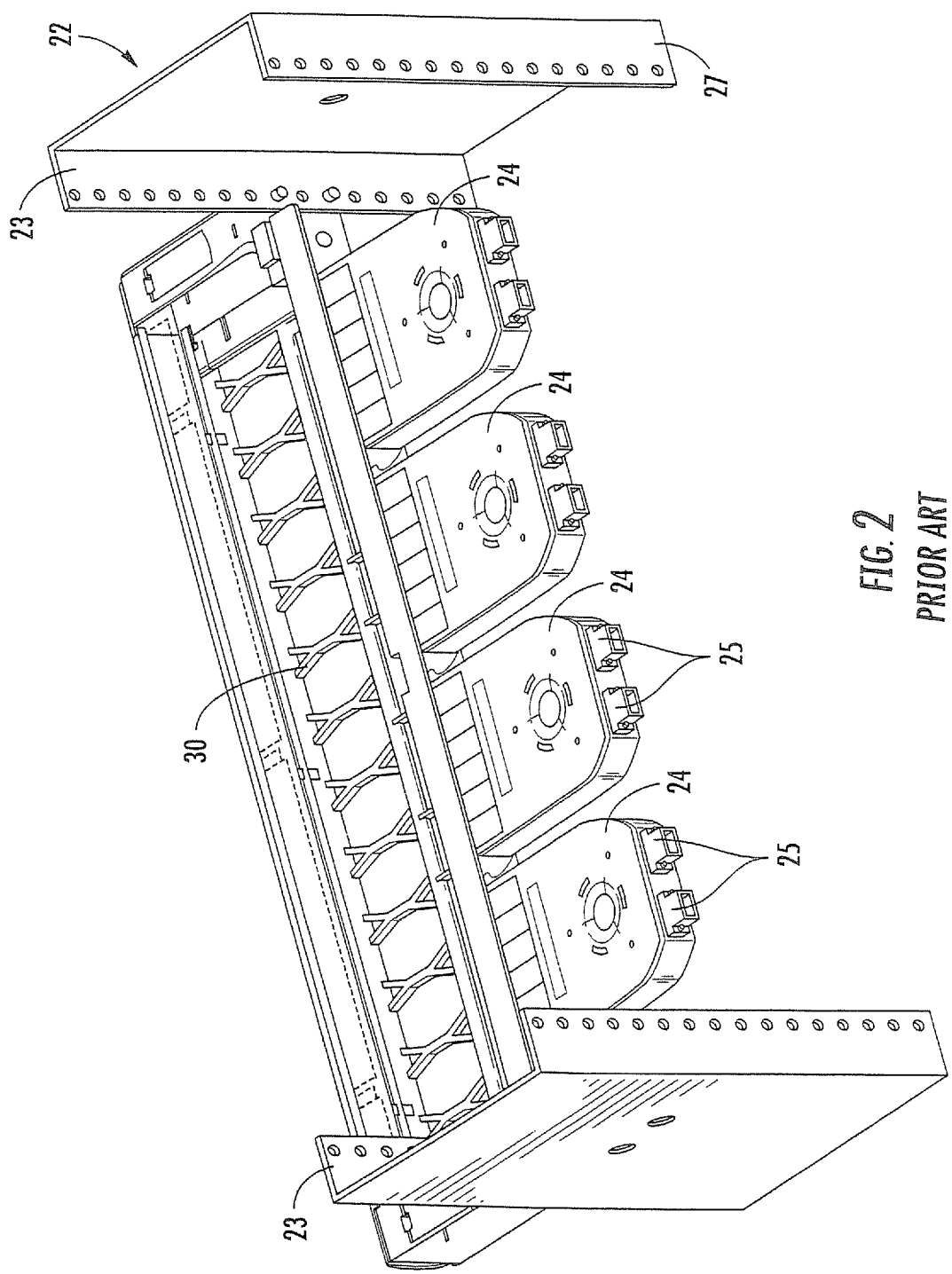
FIG. 2 is a rear perspective view of the system of FIG. 1.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" or "above" the other elements or features. Thus, the exemplary term "under" can encompass both an orientation of over and under. The device may be otherwise oriented (rotated 90 degrees or at other orientations) and the spatially relative descriptors used herein interpreted accordingly.

Also, as used herein the term "connector" is intended to encompass telecommunications connectors and devices employed to facilitate the interconnection of telecommunications cords and cables for the transmission of signals therebetween. A connector may include a termination device at the end of a cord or cable, an adapter that facilitates the interconnection of two termination devices (as may be employed in the interconnection of fiber optic cords and cables, such as may be found in a connector block), a jack, plug, or the like typically employed with copper cables and cords, or other devices that provide a location for the interconnection of cables and cords. Further, as used herein, the term "patch panel" refers to an interconnect device that includes a plurality of connectors on at least one side thereof, whether the connectors are fiber optic adapters such as MPO adapters, jacks such as, for example, RJ-45 style jacks, or another connector type.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein the expression "and/or" includes any and all combinations of one or more of the associated listed items.

Where used, the terms "attached", "connected", "interconnected", "contacting", "mounted" and the like can mean either direct or indirect attachment or contact between elements, unless stated otherwise.

Figure 3:
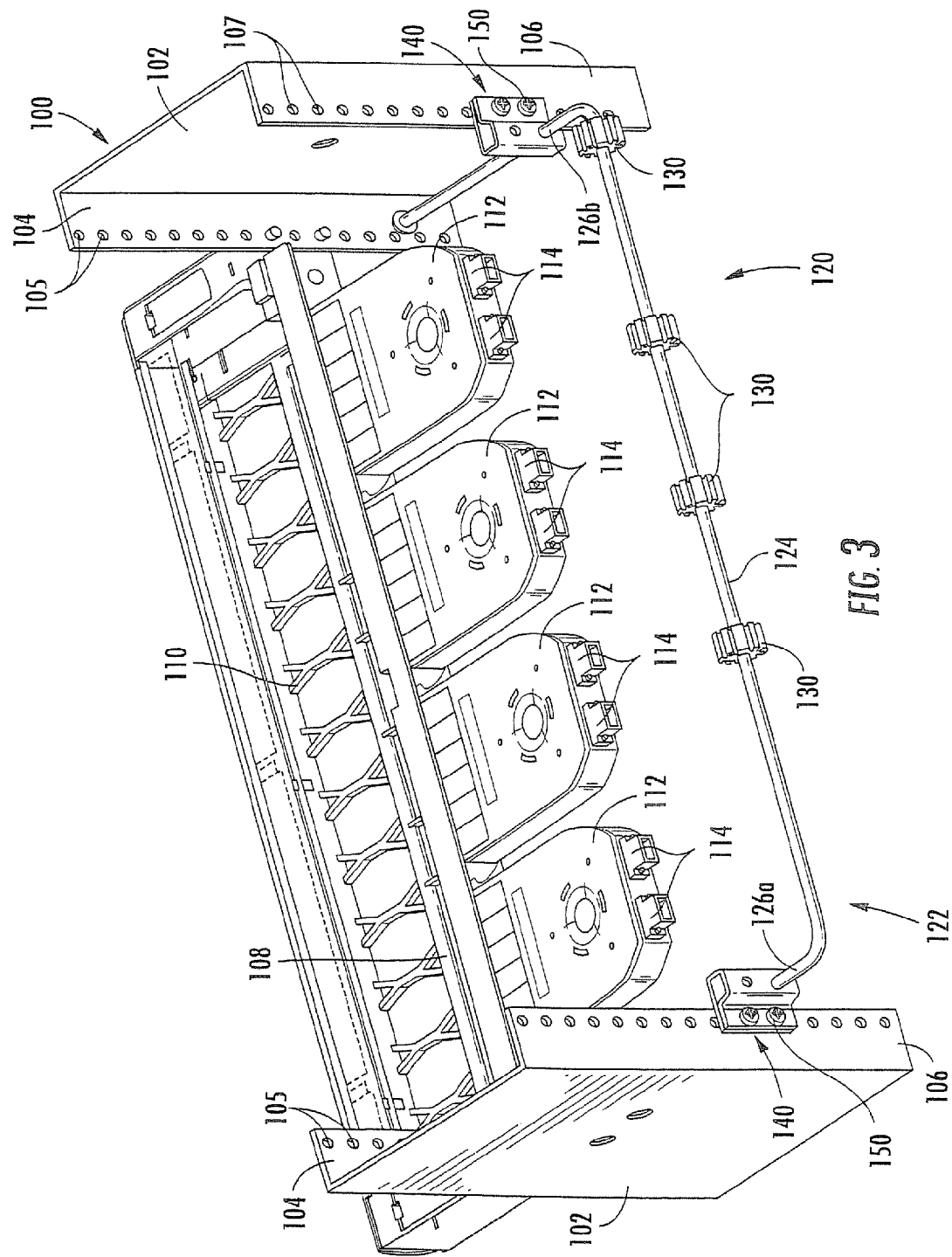
FIG. 3 is a rear perspective view of a communications patching system with a cable management system mounted on a communications racks with 6-inch upright rails according to embodiments of the present invention.

Turning now to the drawings, a 6-inch deep communications rack, designated broadly at 100, is illustrated in FIG. 3. As used herein, the term "rack" is intended to encompass any rack, frame, cabinet or the like on which telecommunications patching panels are typically mounted. The rack 100 includes a pair of opposed upright rails 102, each of which has a front flange 104 with mounting holes 105 and a rear flange 106 with mounting holes 107. In this embodiment, the front and rear flanges 104, 106 are separated from each other by a distance of about 6 inches. A communications patch panel 108 is mounted to the front flange 104, with a trough 110 mounted forwardly of the panel 108. Communications modules 112 (four are shown herein) are attached to the panel 108 and extend rearwardly therefrom. Each of the modules 112 includes two MPO connectors 114 on its rear edge and connectors (not shown) on its front edge to receive patch cords.

Referring still to FIG. 3 and also to FIG. 4, a cable management system 120 is mounted to the rear flanges 106 of the upright rails 102. The cable management system 120 includes a mounting rod 122 that has a straight main segment 124 that extends between two straight arms 126a, 126b. The arms 126a, 126b are substantially parallel to each other and perpendicular to the main segment 124, thereby forming generally a U-shape. Each of the arms 126a, 126b has a stop 128 (in the form of a cap nut) mounted to its free end (see FIGS. 4 and 6). In the illustrated embodiment, the mounting rod 122 is a monolithic member, but in other embodiments may be formed of multiple components or pieces. The mounting rod 122 may be formed of any material, such as steel or the like, that is sufficiently strong and rigid to provide support for cables.

Referring now to FIG. 3 and to FIG. 5, the cable management system 120 also includes a plurality of fiber clips 130, one of which is shown in FIG. 5. Each clip 130 comprises a body 132 that has a substantially cylindrical exterior surface. A number of cable slots 134 (in this instance, nine slots) are circumferentially spaced from each other and extend radially inwardly from the outer surface of the body 132. The bottom of each cable slot 134 includes an enlarged, round recess 136 sized to capture an optical cable (or, in other embodiments, a copper cord or cable). The clip 130 also includes one mounting slot 138 that extends radially inwardly from the outer surface of the body 132. The mounting slot 138 includes an enlarged round recess 139 located in the approximate geometric center of the body 132 that is sized to capture the main segment 124 of the mounting rod 122.

In some embodiments, the clip 130 is formed of a resilient material, such as a polymeric or elastomeric material. An exemplary material is EPDM rubber.

Figure 6A:
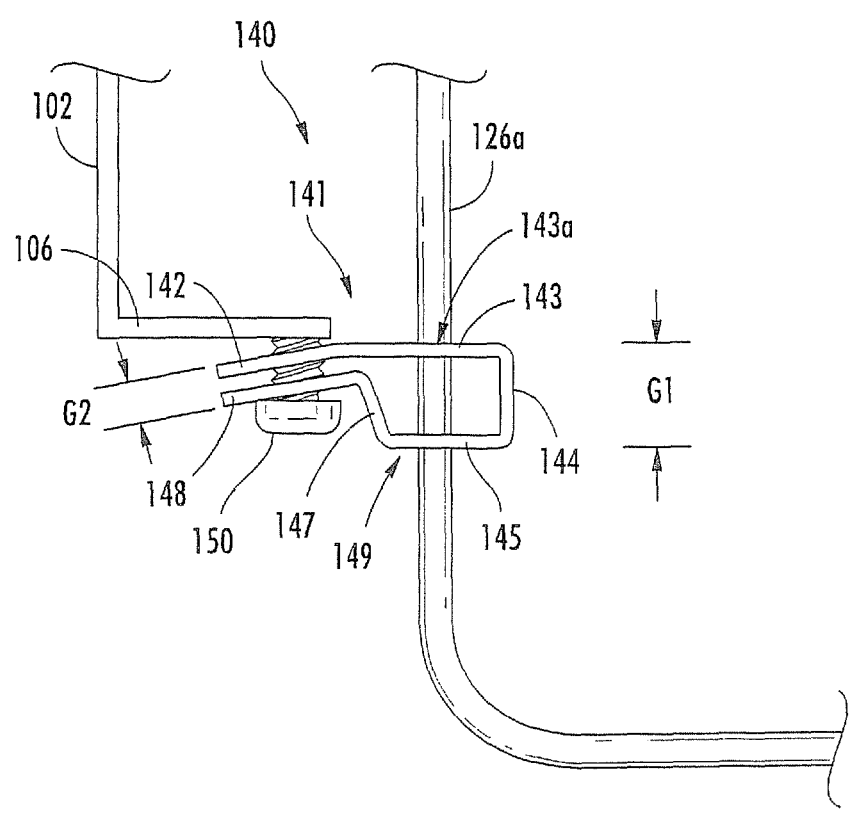
FIG. 6A is an enlarged top view of one mounting bracket of the cable management system of FIG. 3.

Referring now to FIGS. 3, 4 and 6, two mounting brackets 140 are employed to mount the mounting rod 122 to the rear flanges 106 of the upright rails 102. Each mounting bracket 140 includes a front leaf 141 having a compression panel 142 with a pair of holes 142a and a tilting panel 143 with a pair of holes 143a, wherein the tilting panel 143 merges with and is disposed at an angle relative to the compression panel 142. A merging panel 144 is disposed perpendicular to one edge of the tilting panel 143. A rear leaf 149 includes a rod receiving panel 145 that merges with the merging panel 144 and overlies the tilting panel 143. The rod receiving panel 145 includes holes 146 that are generally aligned with the holes 143a. A gap G1 is formed by the rod receiving panel 145 and the tilting panel 142. The rear leaf 149 also includes a transition panel 147, which is attached to the rod receiving panel 145, and a deflecting panel 148, which is attached to an edge of the transition panel 147. The deflecting panel 148 overlies the compression panel 142 and forms a gap G2 therebetween, the gap G2 being smaller than the gap G1. Open-ended apertures 148a in the deflecting panel 148 are generally aligned with the holes 142a.

As can be seen in FIGS. 3 and 6, the arms 126a, 126b of the mounting rod 122 are received in the holes 146 of the rod receiving panel 145 and the holes 143a of the tilting panel 143. The stops 128 are positioned on the ends of the arms 126a, 126b forwardly of the front leaf 141. The mounting rod 122 is mounted to the rack 100 by inserting screws 150 through the open-ended apertures 148a in the deflecting panel 148, through the holes 142a of the compression panel 142, and into the holes 107 in the rear flange 106 of the upright 102.

Figure 7:
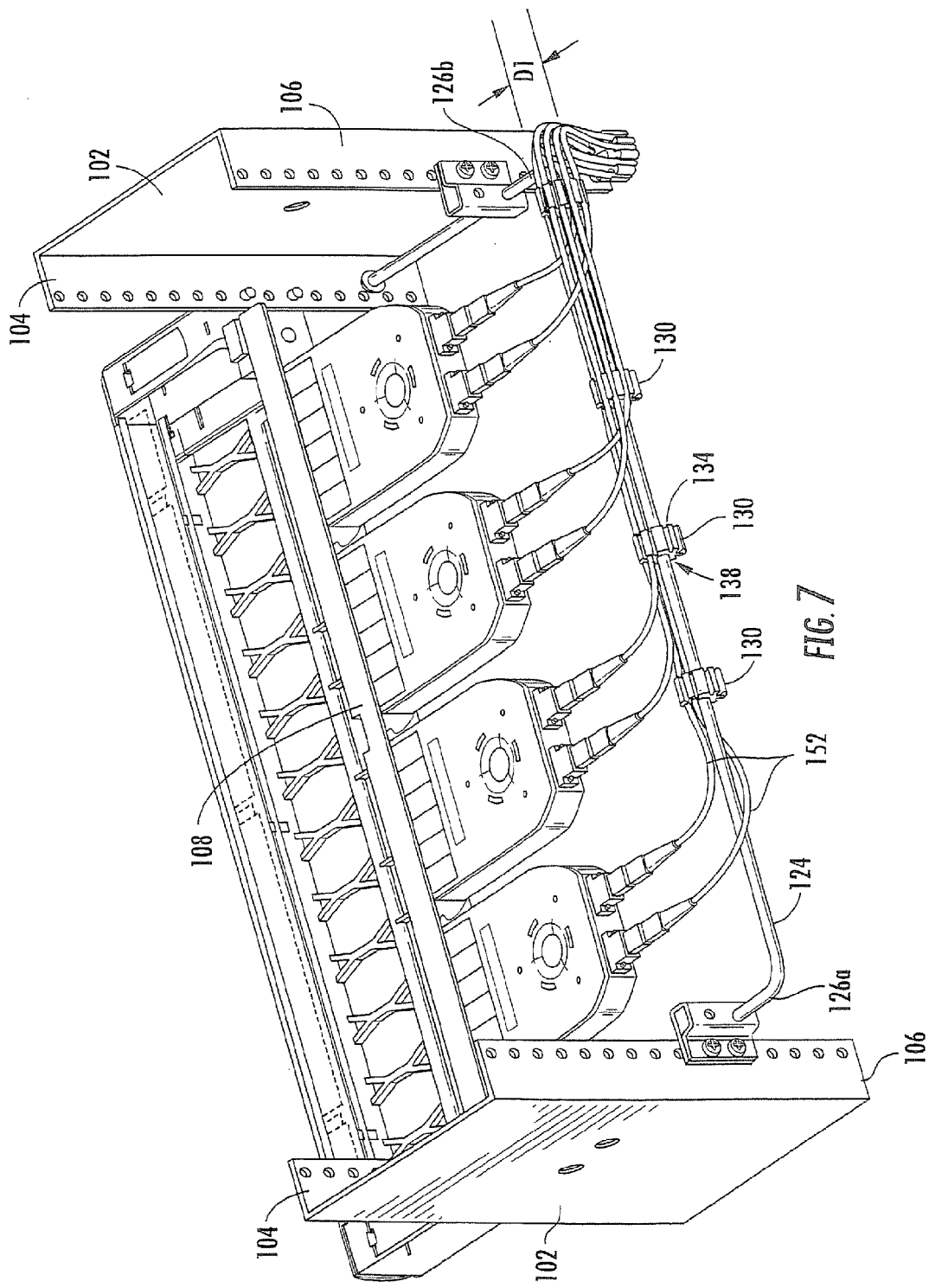
FIG. 7 is a rear perspective view of the cable management system of FIG. 3 with optical fiber cables exiting the communications modules and clipped into an organized arrangement with clips.
Figure 7A:
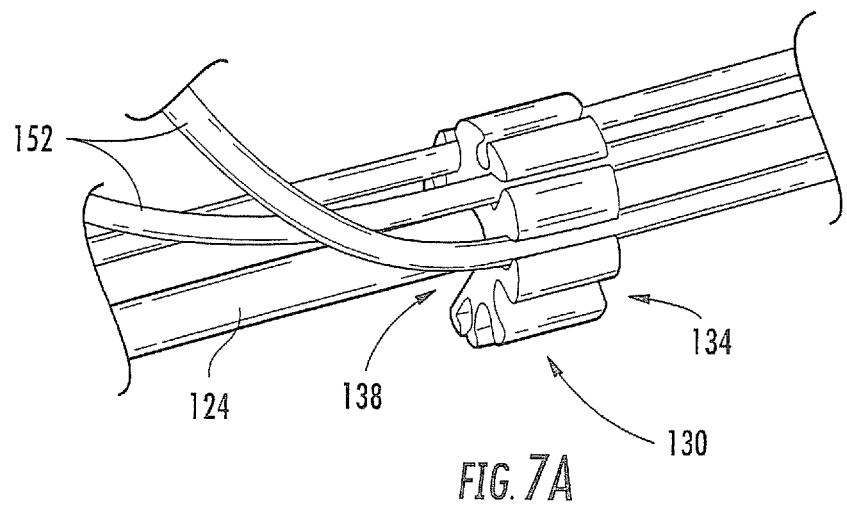
FIG. 7A is an enlarged rear perspective view of a clip shown in FIG. 7.
Figure 8:
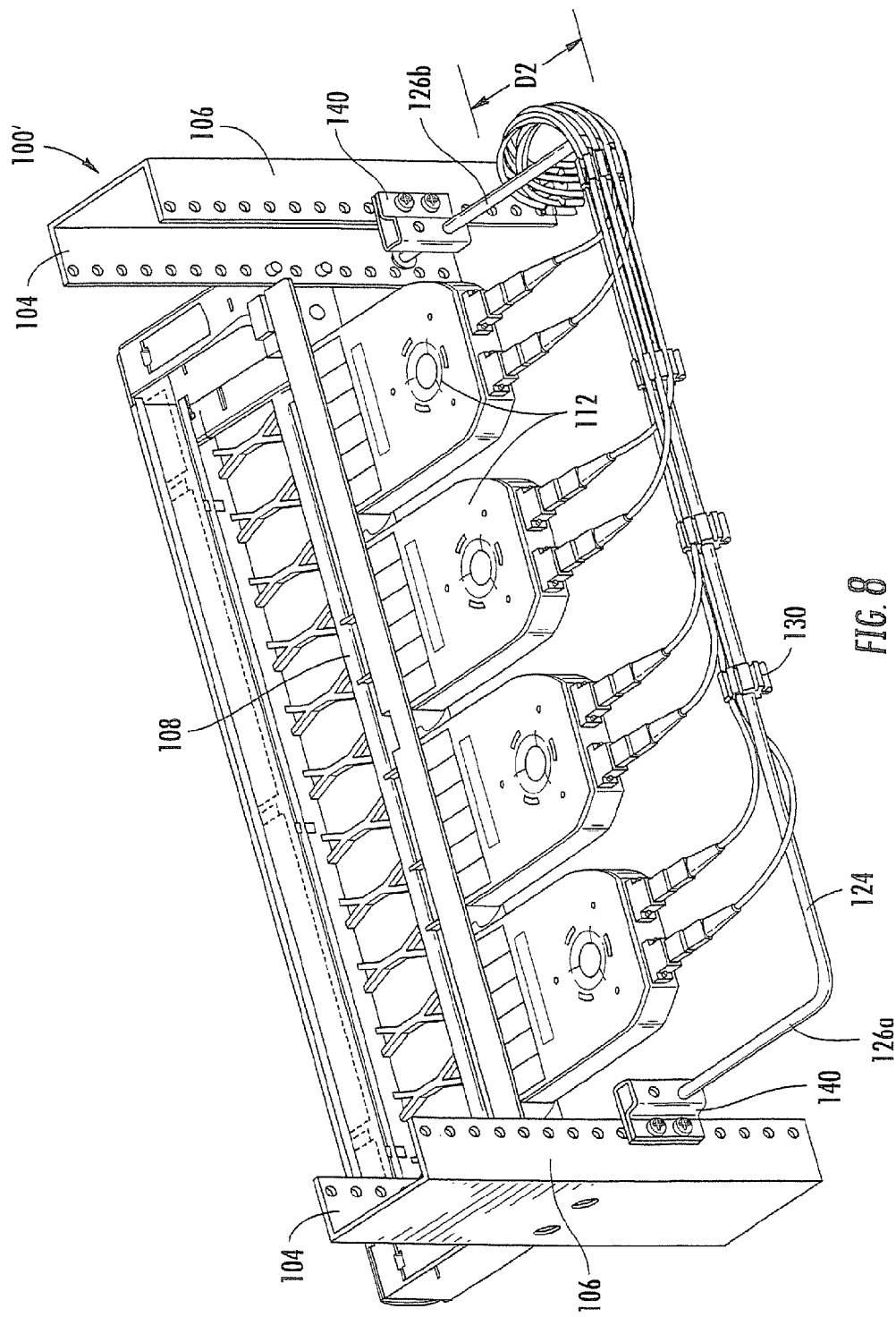
FIG. 8 is a rear perspective view of the cable management system of FIG. 3 mounted on a communications rack with 3 inch rails.
Figure 9:
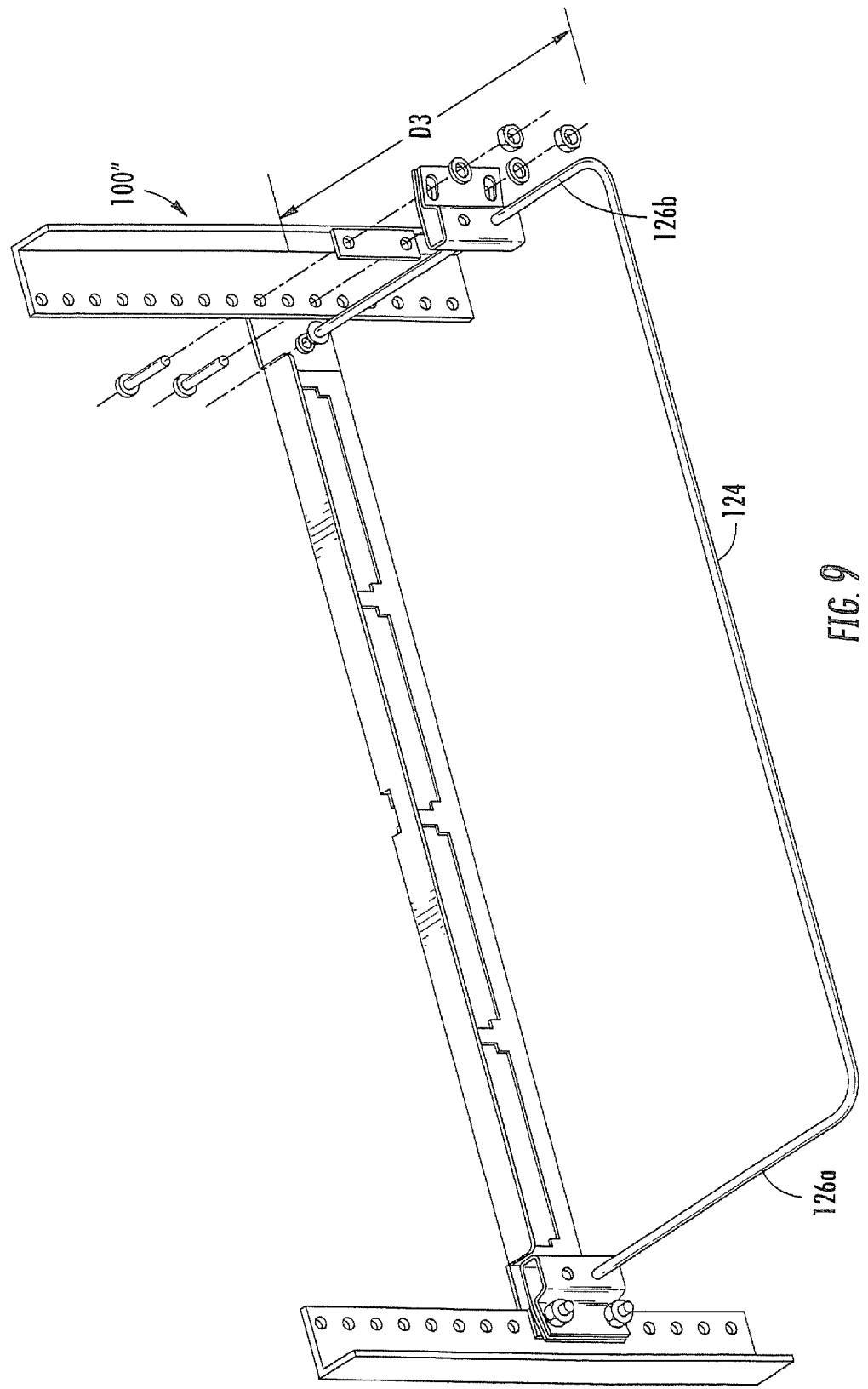
FIG. 9 is a rear perspective view of the cable management system of FIG. 3 mounted to a communications cabinet that lacks a rear flange.

As is shown in the left side of FIG. 6, when the screws 150 are inserted into the mounting bracket 140, but are in a loosened condition, the compression panel 142 and deflecting panel 148 are angled relative to the rear flange 106, and the tilting and rod receiving panels 143, 145 are substantially parallel with the rear flange 106 and perpendicular to the arm 126a. As such, the holes 143a, 146 are substantially aligned (i.e., an axis A1 between the holes 143a, 146 is normal to the rear flange 106 and parallel with the arms 126a, 126b), so the arm 126a of the mounting rod 122 is free to slide within the holes 143a, 146 relative to the mounting bracket 140 and, in turn, to the panel 108 and the rack 100. As such, the distance between the main segment 124 and the rear flange 106b can be adjusted. For example, and as shown in FIG. 7, with a six-inch deep rack 100, the arms 126a, 126b may be inserted mostly, if not entirely, into the holes 143b, 146, such that the main segment 124 is a distance D1 from the rear flanges 106. As shown in FIG. 8, with a three-inch deep rack 100', the arms 126a, 126b can slide relative to the rack 100 such that the main segment 124 is a greater distance D2 from the rear flanges 106 but still essentially the same distance from the modules 112. Finally, as shown in FIG. 9, if the rack 100" lacks a rear flange, the mounting brackets 140 can be mounted to the rear surface of the front flanges 104, and the arms 126a, 126b can be only slightly inserted into the holes 143b, 146 such that the main segment 124 is a distance D3 from the front flanges 104. Thus, it can be seen that the cable management assembly 120 can be positioned a suitable distance from the modules 108 with any of these rack configurations.

As is shown in the right side of FIG. 6, when the screws 150 are in a tightened condition, the head of each screw 150 drives the deflecting panel 148 toward the compression panel 142, thereby reducing (and eventually eliminating) the gap G2 between the compression panel 142 and the deflecting panel 148 and reducing the gap G1 between the tilting panel 143 and the rod receiving panel 145. This action also forces the compression panel 142 into flush contact with the rear flange 106, which angles the tilting panel 143 and the rod receiving panel 145 relative to the arm 126b. In this position, the axis A2 between the holes 143a, 146 is not perpendicular to the rear flange 106 and is parallel with the arms 126a, 126b only when they bend. The tilting action causes the tilting panel 143 and the rod receiving panel 145 to bend and "bite" into the arm 126b, thereby binding it in position.

The use of the clips 130 can also be seen in FIG. 7. Each clip 130 can be mounted in a desired location on the main segment 124 of the mounting rod 122 by inserting the mouth of the mounting slot 139 onto the main segment 124 and forcing the clip 130 onto the main segment 124. The main segment 124 "bottoms out" in the recess 139 of the mounting slot 138. In some embodiments, the clip 130 is configured to slide along the main segment 124 to facilitate positioning thereof. Once the clip 130 is mounted on the main segment 124, cables 152 can be inserted into available cable slots 134 in the clip 130, once again with each cable 152 being forced into the mouth of a cable slot 134 until it bottoms out in the recess 136. By mounting multiple clips 130 on the mounting rod 122, cables exiting the modules 108 can be maintained in a neat and organized manner.

Turning now to FIG. 10, it can also be seen that the clips 130 can be used without a mounting rod. In FIG. 10, the clips 130 are used to "bundle" fibers 252 exiting the modules 212 to improve their organization, but are free-floating rather than being fixed relative to the rack 100.

Those skilled in this art will appreciate that the components discussed above may take other configurations. With respect to the mounting rod 122 or other cable mounting member, for example, the main segment 124 of the mounting rod 122 may be an arcuate, wavy, or otherwise non-straight member to which cables may be mounted. The cap nuts 128 may be replaced with another variety of stop; for example, the ends of the arms 126a, 126b may simply be bent or deformed to form a stop. Also, the mounting rod 122 may create a sliding relationship with the rack 100 and panel 108 in another way; for example, the arms 126a, 126b of the mounting rod 122 may have a telescoping design to enable the main segment 124 to vary in distance from the panel 108. Further, in some embodiments, the mounting rod 122 may not slide relative to the panel 108.

The clip 130 may also take different configurations. As an example, if the clip 130 is to be used in a free-floating manner as shown in FIG. 10, it may lack a mounting slot 138. The exterior surface of the body 132 may also take a different shape: it may be ovoid or another round shape, or may be square, rectangular, pentagonal, hexagonal, etc. In some embodiments, the mounting slot 138 and/or the cable slots 134 may lack a recess 139, 136 at their bottom ends, and/or the slots 138, 134 and recesses 139, 136 may be sized differently *for example, to receive a copper cable or cord). Moreover, in some embodiments the mounting rod 122 and/or the mounting clips 140 may utilize a different style of clip or binding device to capture cable on the main segment 124.

The mounting bracket 140 may also take a different configuration. For example, sliding of the mounting rod 122 relative to the mounting bracket 140 may be permitted/prevented with a set screw or the like, or even with a slip-resistant material, such as rubber, lining the holes in which the mounting rod 122 is received.

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A communications interconnection system, comprising:
   a communications rack having a pair of upright members;
   a patch panel mounted to the upright members, the patch panel having mounting locations for telecommunications connectors;
   a cable management system mounted to the rack, the cable management system comprising a cable mounting member having a cable securing portion and a pair of arms attached to the cable securing portion, the arms being substantially parallel to each other and slidably mounted relative to the panel to enable adjustment of the distance between the cable securing portion and the communications rack; and wherein the cable management system further comprises mounting brackets attached to the communications rack, the arms being mounted to the mounting brackets, and wherein the mounting brackets are configured such that, in a first condition, the arms are able to slide relative to the mounting brackets, and in a second condition, the arms are fixed relative to the mounting brackets, and wherein the cable mounting brackets and arms are configured such that the arms can be fixed relative to the mounting brackets at any point along the length of the arms.

2. The system defined in claim 1, further comprising a cable capturing structure mounted on the cable securing portion.

3. The system defined in claim 2, wherein the cable capturing structure is a clip that receives the cable securing portion in a first slot and is configured to receive cables in additional slots.

4. The system defined in claim 1, wherein the cable securing portion is a substantially straight main segment that is substantially perpendicular to the arms.

5. The system defined in claim 1, wherein cable securing portion and the arms comprise a monolithic rod.

6. The system defined in claim 1, wherein the cable mounting member further comprises stops on free ends of the arms.

7. A communications interconnection system, comprising:
a communications rack having a pair of upright members;
a patch panel mounted to the upright members, the patch panel having mounting locations for telecommunications connectors;
a cable management system mounted to the rack, the cable management system comprising a cable mounting member having a cable securing portion and a pair of arms attached to the cable securing portion, the arms being substantially parallel to each other and slidably mounted relative to the panel to enable adjustment of the distance between the cable securing portion and the communications rack; and
a clip that receives the cable securing portion in a first slot and is configured to receive cables in additional slots, the additional slots being generally parallel with the first slot;
wherein the cable securing portion is a substantially straight main segment that is substantially perpendicular to the arms.

8. The system defined in claim 7, wherein cable securing portion and the arms comprise a monolithic rod.

9. The system defined in claim 7, wherein the cable mounting member further comprises stops on free ends of the arms.

10. The system defined in claim 7, wherein the cable management system further comprises mounting brackets attached to the communications rack, the arms being mounted to the mounting brackets, and wherein the mounting brackets are configured such that, in a first condition, the arms are able to slide relative to the mounting brackets, and in a second condition, the arms are fixed relative to the mounting brackets.

11. The system defined in claim 7, wherein the clip comprises a body with an external surrounding surface, and wherein the additional slots extend radially inwardly from the external surrounding surface, the additional slots being of a first width, and wherein the mounting slot extends radially inwardly from the external surrounding surface, the mounting slot being of a second width.

12. A communications interconnection system, comprising:
a communications rack having a pair of upright members;
a patch panel mounted to the upright members, the patch panel having mounting locations for telecommunications connectors;
a cable management system mounted to the rack, the cable management system comprising a cable mounting member having a cable securing portion and a pair of arms attached to the cable securing portion, the arms being substantially parallel to each other and slidably mounted relative to the panel to enable adjustment of the distance between the cable securing portion and the communications rack;
wherein the cable management system further comprises mounting brackets attached to the communications rack, the arms being mounted to the mounting brackets, and wherein the mounting brackets are configured such that, in a first condition, the arms are able to slide relative to the mounting brackets, and in a second condition, the arms are fixed relative to the mounting brackets;
wherein the cable mounting member further comprises stops on free ends of the arms; and
wherein each of the mounting brackets comprises:
a first leaf panel having a compression panel with a first hole and a tilting panel with a second hole, the compression panel being disposed at an oblique angle to the tilting panel;
a merging panel attached to the tilting panel; and
a second leaf attached to the merging panel and having a rod receiving panel and a deflecting panel;
wherein the rod receiving panel is disposed in generally parallel relationship with the tilting panel, the rod receiving panel being spaced apart from the tilting panel to form a gap of a first width; the rod receiving panel having a third hole that is generally aligned with the second hole of the tilting panel; and
wherein the deflecting panel is disposed in generally parallel relationship with the compression panel, the deflecting panel being spaced apart from the compression panel to form a gap of a second width, the deflecting panel having an aperture that is generally aligned with the first hole of the compression panel.

13. The system defined in claim 12, further comprising a cable capturing structure mounted on the cable securing portion.

14. The system defined in claim 13, wherein the cable capturing structure is a clip that receives the cable securing portion in a first slot and is configured to receive cables in additional slots.

15. The system defined in claim 12, wherein the cable securing portion is a substantially straight main segment that is substantially perpendicular to the arms.

16. The system defined in claim 12, wherein cable securing portion and the arms comprise a monolithic rod.

* * * * *